(12) United States Patent
Rowley (10) Patent No.: US 11,146,407 B2
(45) Date of Patent: Oct. 12, 2021

(54) DIGITAL CERTIFICATE VALIDATION USING UNTRUSTED DATA

(71) Applicant: DigiCert, Inc., Lehi, UT (US)

(72) Inventor: Richard Jeremy Rowley, South Jordan, UT (US)

(73) Assignee: Digicert, Inc., Lehi, UT (US)

( * ) Notice: Subject to any disclaimer, the term of this patent is extended or adjusted under 35 U.S.C. 154(b) by 188 days.

(21) Appl. No.: 16/386,042

(22) Filed: Apr. 16, 2019

(65) Prior Publication Data

US 2019/0319809 A1 Oct. 17, 2019

Related U.S. Application Data (60) Provisional application No. 62/658,998, filed on Apr. 17, 2018.

(51) Int. Cl.
  *H04L 9/32* (2006.01)
  *H04L 29/06* (2006.01)
  *H04L 9/08* (2006.01)

(52) U.S. Cl.
  CPC .......... *H04L 9/3268* (2013.01); *H04L 9/0825* (2013.01); *H04L 9/3215* (2013.01); *H04L 63/18* (2013.01)

(58) Field of Classification Search
  CPC ..... H04L 9/3268; H04L 9/3265; H04L 9/321; H04L 9/3247; H04L 9/3271; H04L 9/3215; H04L 9/3297; H04L 9/3231; H04L 9/006; H04L 9/3213; H04L 9/0825; H04L 9/3236; H04L 9/3239; H04L 9/32; H04L 9/3226; H04L 9/3263; H04L 63/18; H04L 63/126; H04L 63/123; H04L 63/0807; H04L 63/0823; H04L 2209/38; H04L 2209/56; G06F 21/33; G06F 21/64; G06F 21/335; H04W 12/0609
  See application file for complete search history.

(56) References Cited

U.S. PATENT DOCUMENTS

| | | | | |
|---|---|---|---|---|
| 10,263,783 | B2* | 4/2019 | Bohli | G06F 21/64 |
| 10,505,741 | B1* | 12/2019 | Conley | H04L 9/083 |
| 2004/0111607 | A1* | 6/2004 | Yellepeddy | H04L 9/3268 713/155 |
| 2005/0021969 | A1* | 1/2005 | Williams | H04L 9/3268 713/176 |
| 2005/0132202 | A1* | 6/2005 | Dillaway | H04L 9/3226 713/179 |

(Continued)

*Primary Examiner* — David Garcia Cervetti
(74) *Attorney, Agent, or Firm* — Knobbe, Martens, Olson and Bear, LLP (57) ABSTRACT

A method, system and apparatus for authenticating target recipients for digital certificates. A certificate authority authentication system receives a request from an entity for a digital certificate including untrusted certificate validation data. The authentication system initiates a communication link using to untrusted certificate validation data to generate verified untrusted certificate validation data. Subsequently or concurrently, the system obtains, from a confirmation computing system, trusted certificate validation data. The authentication system compares the verified untrusted certificate validation data with the trusted certificate validation data and, based on the comparison, authenticates the entity and issues the requested digital certificate.

19 Claims, 3 Drawing Sheets

(56) References Cited

U.S. PATENT DOCUMENTS

| | | | |
|---|---|---|---|
| 2005/0144440 A1* | 6/2005 | Catherman | H04L 9/3236 713/156 |
| 2006/0085465 A1* | 4/2006 | Nori | G06F 16/213 |
| 2006/0174106 A1* | 8/2006 | Bell | H04L 9/3263 713/156 |
| 2008/0034350 A1* | 2/2008 | Conti | G06F 21/74 717/124 |
| 2008/0069363 A1* | 3/2008 | Catherman | G06F 21/602 380/282 |
| 2008/0126801 A1* | 5/2008 | Lee | H04L 9/3247 713/167 |
| 2009/0083539 A1* | 3/2009 | Catherman | G06F 21/57 713/156 |
| 2009/0222674 A1* | 9/2009 | Leichsenring | G06F 21/51 713/193 |
| 2010/0082987 A1* | 4/2010 | Thom | G06F 21/34 713/171 |
| 2010/0153918 A1* | 6/2010 | Mallick | G06F 8/71 717/121 |
| 2010/0318791 A1* | 12/2010 | Shamsaasef | H04L 9/3268 713/158 |
| 2011/0119651 A1* | 5/2011 | Utschig-Utschig | G06F 8/35 717/107 |
| 2011/0154010 A1* | 6/2011 | Springfield | H04L 9/3234 713/100 |
| 2011/0179477 A1* | 7/2011 | Starnes | H04L 63/12 726/9 |
| 2013/0128894 A1* | 5/2013 | Shah | H04W 8/10 370/401 |
| 2013/0332726 A1* | 12/2013 | Galehouse | H04L 63/08 713/156 |
| 2014/0173761 A1* | 6/2014 | Hong | G06F 21/10 726/30 |
| 2014/0187203 A1* | 7/2014 | Bombacino | H04W 12/033 455/411 |
| 2014/0298420 A1* | 10/2014 | Barton | H04L 63/10 726/4 |
| 2015/0172064 A1* | 6/2015 | Takenaka | H04L 9/3247 713/156 |
| 2015/0271679 A1* | 9/2015 | Park | H04W 12/37 713/187 |
| 2016/0028701 A1* | 1/2016 | Hua | H04L 63/0471 713/151 |
| 2016/0294559 A1* | 10/2016 | Dabak | G06F 9/45558 |
| 2017/0111323 A1* | 4/2017 | Borkar | H04L 63/0823 |
| 2017/0147819 A1* | 5/2017 | Vasilenko | G06F 21/554 |
| 2017/0185774 A1* | 6/2017 | Sahita | G06F 21/577 |
| 2017/0242719 A1* | 8/2017 | Tsirkin | G06F 9/4403 |
| 2017/0257361 A1* | 9/2017 | Niemela | G06F 21/51 |
| 2017/0264443 A1* | 9/2017 | Tu | H04L 9/3268 |
| 2017/0302459 A1* | 10/2017 | Fenner | H04L 9/321 |
| 2017/0357496 A1* | 12/2017 | Smith | H04L 9/3228 |
| 2018/0018459 A1* | 1/2018 | Zhang | G06F 21/554 |
| 2018/0019876 A1* | 1/2018 | Moss | G06F 21/64 |
| 2018/0191739 A1* | 7/2018 | Kraft | G06F 21/566 |
| 2018/0198626 A1* | 7/2018 | Kroonmaa | H04L 9/0637 |
| 2018/0234255 A1* | 8/2018 | Fu | H04L 9/08 |
| 2018/0254896 A1* | 9/2018 | Moysi | H04L 9/3268 |
| 2019/0123890 A1* | 4/2019 | Scott | H04L 9/0643 |
| 2019/0156023 A1* | 5/2019 | Gerebe | H04L 9/3226 |
| 2019/0163911 A1* | 5/2019 | Kliewer | H04L 9/3239 |
| 2019/0207769 A1* | 7/2019 | Donohoe | G06F 21/6245 |
| 2019/0245680 A1* | 8/2019 | Boutaba | G06F 21/64 |
| 2019/0334920 A1* | 10/2019 | Kelly | H04L 9/3239 |
| 2020/0057760 A1* | 2/2020 | Zhao | G06F 16/27 |
| 2020/0076613 A1* | 3/2020 | Ciscato | H04L 9/3247 |
| 2020/0099522 A1* | 3/2020 | Yang | B60R 25/241 |
| 2020/0250344 A1* | 8/2020 | Rahn | H04L 9/3247 |

* cited by examiner

DIGITAL CERTIFICATE VALIDATION USING UNTRUSTED DATA

RELATED APPLICATIONS

This application claims the benefit of priority of U.S. Provisional Patent Application No. 62/658,998, filed Apr. 17, 2018, entitled "DIGITAL CERTIFICATE VALIDATION USING UNTRUSTED DATA." The contents of this priority application is hereby incorporated by reference herein in its entirety and for all purposes.

BACKGROUND

The present disclosure relates generally to the field of authenticating a requestor of a digital certificate.

BRIEF DESCRIPTION OF THE DRAWINGS

The following drawings and the associated descriptions are provided to illustrate embodiments of the present disclosure and do not limit the scope of the claims.

While the foregoing "Brief Description of the Drawings" references generally various embodiments of the disclosure, an artisan will recognize from the disclosure herein that such embodiments are not mutually exclusive. Rather, the artisan would recognize a myriad of combinations of some or all of such embodiments.

DETAILED DESCRIPTION

Overview

Digital certificates play a critical role in network or inter-computing system communications, such as Internet communications, as they enable one computing system to trust communications received from another computing system.

In some cases, to obtain a digital certificate, a public-private key pair is generated for a computing system, and a digital certificate request is communicated to a certificate authority. The digital certificate can include the public key of the public-private key pair along with data that corresponds to a computing system or entity that is to be associated with the public key (also be referred to as a target certificate recipient). In response to the digital certificate request, the certificate authority first confirms the received data with a third party. Only after the certificate authority confirms the received data with a third party, then the certificate authority uses the confirmed data to initiate one or more communications with the target certificate recipient or requesting system to verify the confirmed data. Once the confirmed data is verified with the target certificate recipient or requesting system, the certificate authority issues the digital certificate for the target certificate recipient.

Verifying the data only after confirming it with the third-party computing system can be time consuming and can result in the non-issuance of, or significant delay in issuing, a digital certificate. For example, in some cases, the third-party computing system or service may be unavailable to confirm the received data until hours or days after the digital certificate request is received. The delay in confirming the received data can result in the requesting system missing or distrusting any verification requests received from the certificate authority. For example, if the certificate authority generates a verification request that includes an email message to verify the confirmed data, and the email is received by the requesting system days after the digital certificate request was made, the requesting system may automatically discard or delete the verification request email without review.

To improve authentication of a target certificate recipient and the issuance of digital certificates, a certificate authority authentication system can initiate a verification process using certificate validation data that is not confirmed or trusted by the certificate authority authentication system (also referred to herein as untrusted certificate validation data). The verification process can be done before or concurrently with confirming the untrusted certificate validation data with a confirmation computing system. By using untrusted certificate validation data for verification (and before or concurrently with confirming the untrusted certificate validation data), the certificate authority authentication system can significantly decrease the digital certificate issuance time and increase the efficiency and rate of digital certificate issuance. By decreasing the response time of digital certificate requests, the certificate authority authentication system can increase communication and/or data security. For example, computing systems can more quickly obtain digital certificates that enable them to securely communicate with other computing systems or communicate in a trusted manner. As such, the certificate authority authentication system improves the functioning of existing computing systems and computer networks.

Environment Overview

Figure 1:
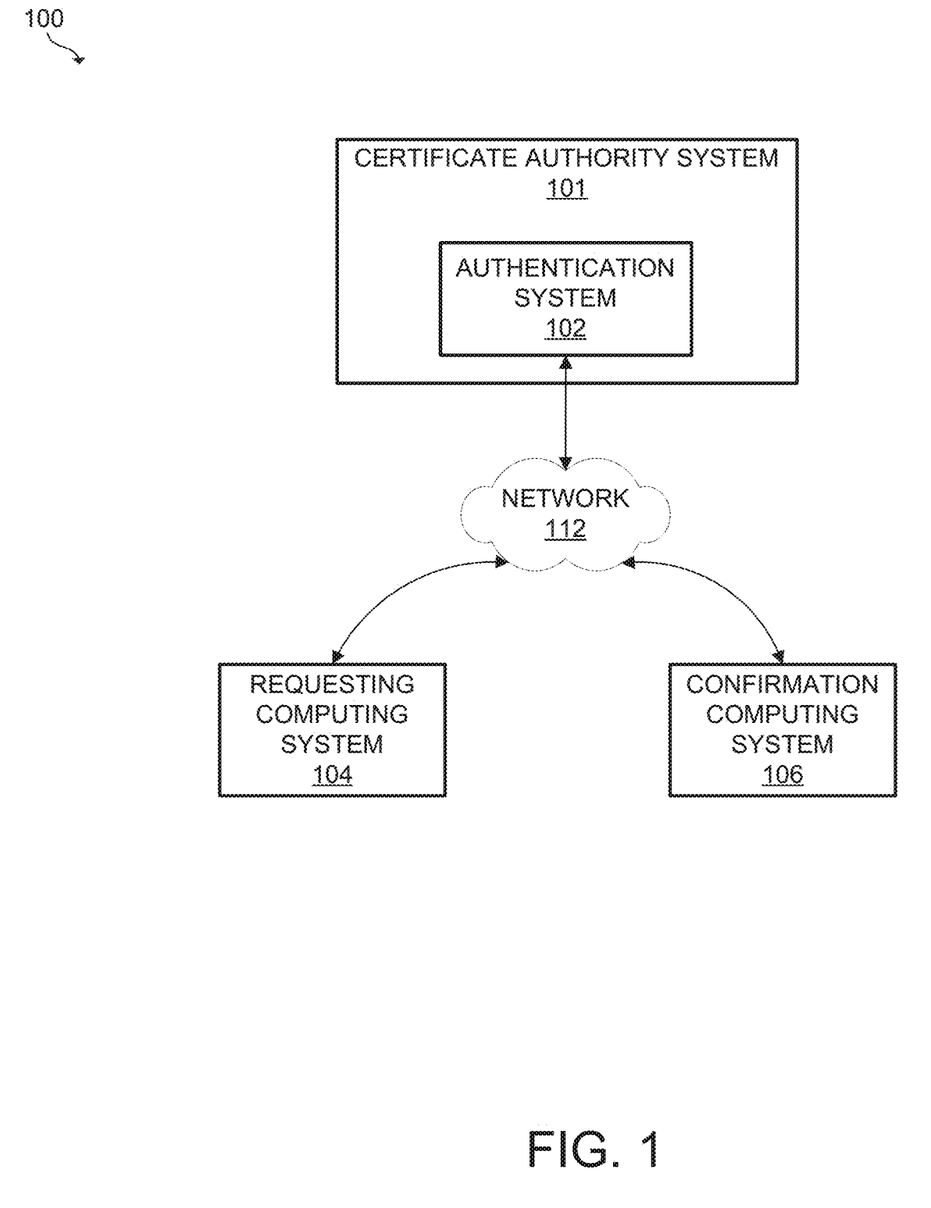
FIG. 1 is a block diagram illustrative of an embodiment of an environment for issuing digital certificates.

FIG. 1 is a block diagram illustrating an embodiment of various computing systems in a digital certificate issuance environment 100. In the illustrated embodiment, the environment 100 includes a certificate authority authentication system 102 as part of a certificate authority system 101, a requesting computing system 104, and a confirmation computing system 106.

The certificate authority authentication system 102, requesting computing system 104, and confirmation computing system 106 can each be implemented using one or more computing devices, such as, but not limited to one or more servers, processors, computing devices, isolated execution environments (e.g., virtual machines, containers, etc.), etc. The certificate authority authentication system 102, requesting computing system 104, and confirmation computing system 106 can communicate via a network 112 to request a digital certificate, verify and confirm certificate validation data, and issue a digital certificate. The network 112 can be a local area network (LAN) or wide area network (WAN), such as the Internet.

The confirmation computing system 106 can be distinct from and unaffiliated with the requesting computing system 104 and the certificate authority authentication system 102 and can include publicly or privately available information related to various computing systems or entities (e.g., person or commercial entity), including the requesting computing system 104 and/or the target certificate recipient. For example, the confirmation computing system 106 can correspond to a third-party database that includes publicly available information about commercial entities, such as the official name, domain names owned by, addresses, phone numbers, etc., of the commercial entities. In some embodiments, the confirmation computing system 106 can correspond to one or more government-sponsored databases or computing systems, such as the commercial registries of a state secretary of state, the securities exchange commission (SEC), government clearing houses, internal revenue service (IRS), etc.

The requesting computing system 104 can be associated with an entity that desires a digital certificate, such as, but not limited to an organization validated certificate, extended validation certificate, etc. In some embodiments, the requested digital certificate can be for the requesting computing system 104 or for another computing system, domain name, website, code, entity, etc., associated with the requesting computing system 104 (also referred to herein as a target certificate recipient).

Prior to, or as part of requesting a digital certificate, the requesting computing system 104 can generate or obtain a public-private key pair. In addition, the requesting computing system 104 can generate a digital certificate request that includes certificate request data. The certificate request data can include the public key of the public-private key pair, an identification of the target certificate recipient, as well as certificate validation data that has not been confirmed by or is not trusted by the certificate authority authentication system 102 (also referred to herein as untrusted certificate validation data).

In some embodiments, the identification of the target certificate recipient can include an identifier for the target certificate recipient, such as, but not limited to the name of the target certificate recipient, a domain name, server ID, etc. As described herein, in some cases, the requesting computing system 104 is the target certificate recipient, and in certain embodiments, a different computing system or entity is the target certificate recipient.

The certificate validation data can include information that is identified as being related to the target certificate recipient and identified as being usable to authenticate the target certificate recipient. However, as this information has not been confirmed by the certificate authority authentication system 102, it is not trusted by the certificate authority authentication system 102. In some cases, the certificate validation data can include, but is not limited to any one or any combination of one or more email addresses, domain names, corporate names, phone numbers, addresses, supporting data, URL, or other information that is identified as being usable to communicate with the target certificate recipient, and determine that the certificate validation data is associated with or controlled by the target certificate recipient (e.g., that an email address or phone number included in the certificate validation data can be used to contact the entity that is to be associated with the public key).

The certificate authority authentication system 102 can form part of a certificate authority system 101 and can be used to authenticate target certificate recipients. The certificate authority system 101 can include other component or system in addition to the certificate authority authentication system 102. For example, the certificate authority system 101 can include a certificate management system, certificate revocation system, etc. to enable the management and revocation of digital certificates, etc.

In some embodiments, the certificate authority authentication system 102 receives the digital certificate request from the requesting computing system 104 and uses the untrusted certificate validation data to authenticate the target certificate recipient and issue a digital certificate. In certain embodiments, as part of the authentication, the certificate authority authentication system 102 can verify the untrusted certificate validation data with the target certificate recipient prior to or concurrently with confirming the untrusted certificate validation data with the confirmation computing system 106. In some embodiments, the certificate authority authentication system 102 confirms the untrusted certificate validation data with the confirmation computing system 106 only after verifying the untrusted certificate validation data with the target certificate recipient.

As mentioned, the certificate authority authentication system 102 can verify untrusted certificate validation data with the target certificate recipient (or requesting computing system 104 as the case may be). The certificate authority authentication system 102 can then compare the verified but untrusted certificate validation data with confirmed or trusted certificate validation data (which can be confirmed with the confirmation computing system 106 after or concurrently with the verification of the untrusted certificate validation data). Based on a match between the verified but untrusted certificate validation data and the confirmed certificate validation data, the certificate authority authentication system 102 can authenticate the target certificate recipient and issue a digital certificate for the target certificate recipient.

In some cases, the certificate authority authentication system 102 can verify the untrusted certificate validation data with the target certificate recipient immediately upon receipt or soon after receipt (e.g., within a few minutes or less than an hour) of the digital certificate request. In certain cases, the certificate authority authentication system 102 can automatically, without human intervention, initiate the verification of the untrusted certificate validation data with the target certificate recipient in response to receipt of the digital certificate request.

As a non-limiting example, the certificate authority authentication system 102 can initiate communication with the target certificate recipient using the untrusted certificate validation data. In some cases, the certificate authority can initiate communication using an automated messaging service, such as, but not limited to, an automatically generated email, SMS, multi-media message, or computer-initiated phone call, that enables the target certificate recipient to interact with the certificate authority authentication system 102. For example, the certificate authority authentication system 102 can automatically generate and communicate an email that includes a hyperlink enabling a target certificate recipient to verify that the target certificate recipient is associated with the untrusted certificate validation data provided in the digital certificate request and/or the public key. As yet another example, a computer-initiated phone call can enable the target certificate recipient to indicate via touch tone or automated response that it is associated with the untrusted certificate validation data and/or the public key.

Concurrently, or following the verification of the untrusted certificate validation data with the target certificate recipient, the certificate authority authentication system 102 can confirm the untrusted certificate validation data with the confirmation computing system 106. In some cases, the certificate authority authentication system 102 can request data associated with the target certificate recipient from the confirmation computing system 106 and compare the received data with the untrusted certificate validation data received in the digital certificate request. If the data received from the confirmation computing system 106 matches the untrusted certificate validation data, the certificate authority authentication system 102 can confirm the untrusted certificate validation data or identify it as confirmed or trusted certificate validation data.

As a non-limiting example, suppose the certificate validation data includes contact information for the requesting computing system 104 (e.g., a target certificate recipient) such as an email address, domain name, corporate name, phone number, and address. The certificate authority authentication system 102 can determine whether the email address, domain name, corporate name, phone number, and address provided as part of the untrusted certificate validation data matches the data in the confirmation computing system 106 for the same entity. Based on a match, the certificate authority authentication system 102 can determine that the untrusted certificate validation data is confirmed or generate or identify confirmed certificate validation data (also referred to herein as trusted certificate validation data).

In some cases, the certificate authority authentication system 102 can use multiple, distinct confirmation computing systems 106 to confirm the untrusted certificate validation data. For example, one confirmation computing system 106 may not have all the data associated with the untrusted certificate validation data. As yet another example, the certificate authority authentication system 102 may trust the data in one confirmation computing system 106 more for some of the untrusted certificate validation data (e.g., domain name and physical address) and trust another confirmation computing system 106 for other portions of the untrusted certificate validation data (e.g., company name, email addresses, phone numbers, etc.). In such cases, the certificate authority authentication system 102 can confirm some portions of the untrusted certificate validation data using one confirmation computing system 106 and other portions of the untrusted certificate validation data using a different confirmation computing system 106.

In certain embodiments, the certificate authority authentication system 102 uses the untrusted certificate validation data to obtain trusted certificate validation data with or without a comparison to the untrusted certificate validation data. For example, the certificate authority authentication system 102 can use an indication of the identity of the target certificate recipient to obtain data from the confirmation computing system 106 about the identified target certificate recipient. The certificate authority authentication system 102 can then identify the obtained data as trusted certificate validation data. In some cases, the obtained data can be identified as trusted certificate validation data with or without a comparison with the untrusted certificate validation data from the digital certificate request.

Once the certificate validation data is confirmed based on communications with the confirmation computing system 106, the certificate authority authentication system 102 can compare the trusted certificate validation data with the untrusted certificate validation data that was verified with the target certificate recipient.

In some cases, the untrusted certificate validation data used for confirmation can be different from the untrusted certificate validation data used for verification. For example, an email address provided as part of the certificate validation data may be used to verify the untrusted certificate validation data with the requesting computing system 104, whereas a phone number or entity name may be used to confirm the untrusted certificate validation data with the confirmation computing system 106 or generate or identify confirmed certificate validation data. In such cases, the certificate authority authentication system 102 can determine whether the verified untrusted certificate validation data constitutes a match with the confirmed certificate validation data, or whether additional data is to be requested or additional verification or confirmation steps are to be used to authenticate the target certificate recipient.

In some cases, the certificate authority authentication system 102 can determine that the verified untrusted certificate validation data constitutes a match with the trusted certificate validation data based on identical data from each. For example, the same email address or phone number can correspond to the untrusted certificate validation data used for verification with the target certificate recipient and to the trusted certificate validation data identified as a result of the confirmation with the confirmation computing system 106. Based on the identical information, the certificate authority authentication system 102 can determine that the certificate validation data is confirmed and verified, authenticate the target certificate recipient, and issue a digital certificate for the target certificate recipient.

In certain cases, the certificate authority authentication system 102 can determine that the verified untrusted certificate request constitutes a match with the trusted certificate validation data based on similar, but not identical data. For example, an email address may correspond to the untrusted certificate validation data used for verification with the requesting computing system 104 and a domain name may correspond to the untrusted certificate validation data used for confirmation with the confirmation computing system 106. Despite the email address being untrusted or not found in the confirmation computing system 106, the certificate authority authentication system 102 can determine that the verified but untrusted certificate validation data constitutes a match with the trusted certificate validation data based on the domain portion of the untrusted email address being the same as or corresponding to the trusted domain name. As such, the certificate authority authentication system 102 can authenticate the target certificate recipient and issue a digital certificate.

As another non-limiting example, suppose the trusted certificate validation data includes a general phone number identifying a range of extensions and the verified untrusted certificate validation data includes a direct line phone number that falls within the range. Despite the direct line phone number not having an explicit match with the general phone number, the certificate authority authentication system 102 can determine that because the direct line falls within the range of extensions associated with the general number, that there is sufficient overlap to confirm and verify the certificate validation data with the target certificate recipient. As such, the certificate authority authentication system 102 can authenticate the target certificate recipient and issue a digital certificate.

In some embodiments, the certificate authority authentication system 102 can determine that the verified untrusted certificate validation data does not constitute a match with the data from the confirmation computing system 106 and/or is insufficient for authentication purposes. For example, a direct line phone number may correspond to the untrusted certificate validation data used for verification with the requesting computing system 104, and a general phone number may correspond to the certificate validation data used for confirmation with the confirmation computing system 106. Based on a determination that the direct line number and the public number do not match, the certificate authority authentication system 102 can determine that the certificate validation data is not verified and initiate a verification process using the trusted certificate validation data. For example, the certificate authority authentication system 102 can automatically initiate a phone call using the trusted general phone number to verify the certificate validation data, such as the existence of the direct line phone number or an identity of the individual that initiated the digital certificate request.

As another non-limiting example, with reference to the domain of an email address being the same as a trusted domain name, in some embodiments, the certificate authority authentication system 102 can determine that that information is insufficient for authentication purposes (e.g., does not constitute a match) and initiate additional verification steps based on trusted certificate validation data (e.g., the trusted domain name or other trusted certificate validation data).

Figure 2:
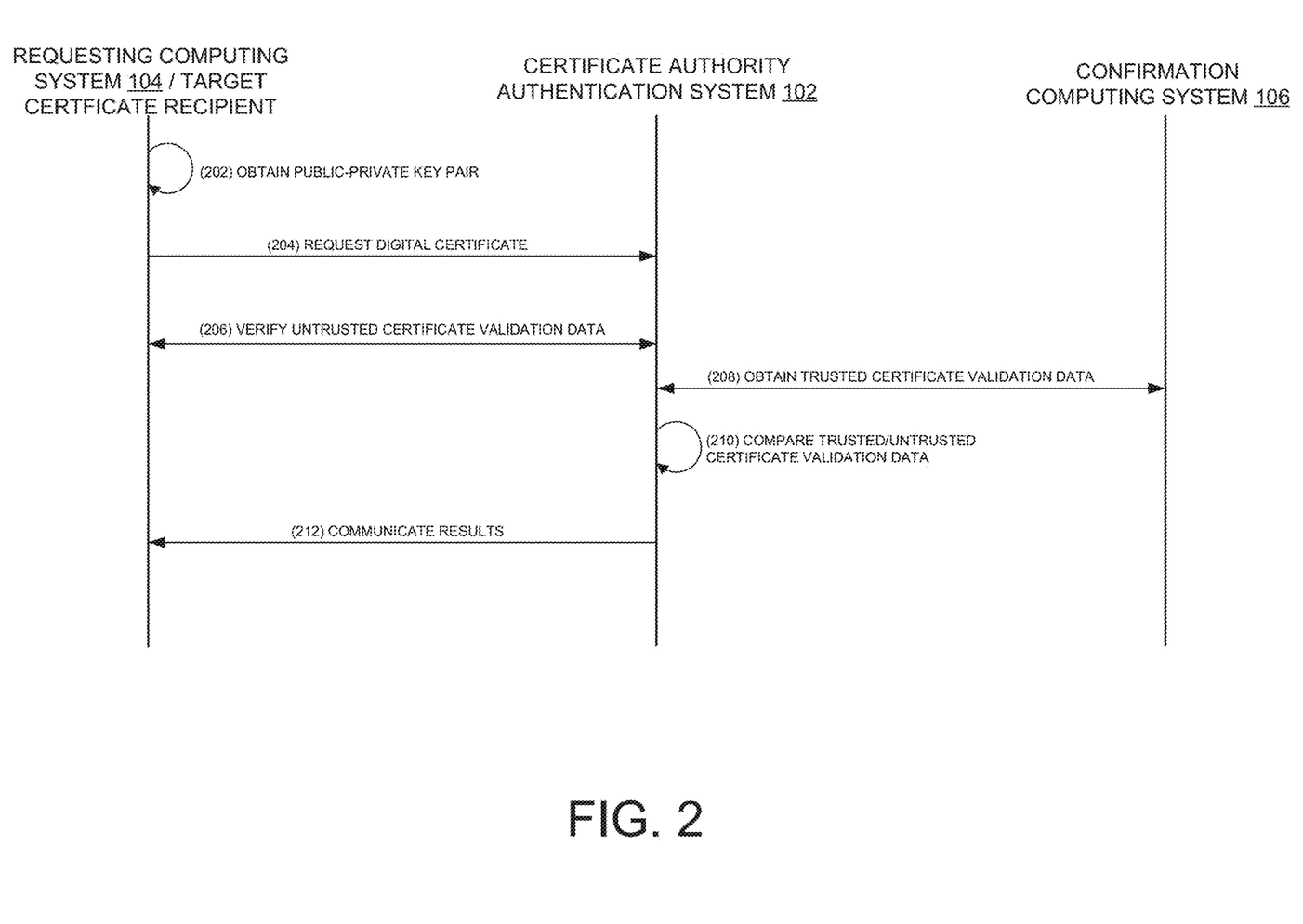
FIG. 2 is a data flow diagram illustrative of an embodiment of authenticating a target certificate recipient using verified untrusted certificate validation data.

Once the certificate validation data is verified and confirmed, the certificate authority authentication system can determine that the target certificate recipient is authenticated and the certificate authority can issue a digital certificate Verifying and Confirming Untrusted Certificate Validation Data FIG. 2 is a data flow diagram illustrating an embodiment of the data flow between the certificate authority authentication system 102, requesting computing system 104, and confirmation computing system 106. For simplicity, in the illustrated embodiment, the requesting computing system 104 is the same as the target certificate recipient. However, it will be understood that the target certificate recipient can be different from the requesting computing system 104. In such embodiments, the certificate authority authentication system 102 can receive the digital certificate request from the requesting computing system 104 and initiate the authentication process for the target certificate recipient. Further, in such embodiments, the certificate authority authentication system 102 can communicate with the target certificate recipient to verify the untrusted certificate validation data. In certain embodiments, the certificate authority authentication system 102 can communicate with the requesting computing system 104 to verify the certificate validation data for a separate target certificate recipient.

At 202, the requesting computing system 104 obtains a public-private key pair. As discussed herein, the public-private key pair can be generated by the requesting computing system 104 or received from another source.

At 204, the requesting computing system 104 communicates a digital certificate request to the certificate authority authentication system 102. As discussed herein, the digital certificate request can include the public key of the public-private key pair, identifier for the target certificate recipient, and certificate validation data.

At 206, certificate authority authentication system 102 uses at least some of the untrusted certificate validation data to verify that the target certificate recipient is associated with the certificate validation data (and/or public-private key pair). For example, as described herein, the certificate authority authentication system 102 can automatically generate and send a verification request message to the target certificate recipient using some of the untrusted certificate validation data, such as an email, phone number, etc., before receiving any indication that the certificate validation data is accurate or confirmed with a confirmation computing system 106. In this way, the certificate authority authentication system 102 can use untrusted certificate validation data to verify an association or relationship between the target certificate recipient and the certificate validation data and/or public-private key pair. For example, the certificate authority authentication system 102 can verify that the target certificate recipient is in control of a domain identified in the certificate validation data or can be communicated with using the certificate validation data, etc.

At 208, the certificate authority authentication system 102 communicates with the confirmation computing system 106 to confirm the untrusted certificate validation data. As described herein, in some cases, the certificate authority authentication system 102 obtains information related to the target certificate recipient from the confirmation computing system 106 and compares it with the certificate validation data. If the received data does not match the certificate validation data, the certificate authority authentication system 102 can reject the certificate request.

In some cases, the certificate authority authentication system 102 can identify additional information about the target certificate recipient based on the information obtained from the confirmation computing system 106 and use the additional information for confirmation and/or verification purposes. For example, in some cases, the untrusted certificate validation data does not include a general or public number for the requesting computing system 104, but the confirmation computing system 106 does include such information. Accordingly, the certificate authority authentication system 102 can identify the general number received from the confirmation computing system 106 as trusted certificate validation data and use it to authenticate the target certificate recipient.

At 210, the certificate authority authentication system 102 compares the verified untrusted certificate validation data with the trusted certificate validation data to determine whether similarities between the two data sets are sufficient to constitute a match and authenticate the relationship between the target certificate recipient and the certificate validation data. As described herein, in some embodiments, the certificate authority authentication system 102 determines that the two datasets constitute a match if the data sets are identical or if the data received from the requesting computing system 104 that is to be confirmed can be matched to data obtained from the confirmation computing system 106. In certain embodiments, certificate authority authentication system 102 determines that the two datasets constitute a match if the data sets are similar, such as email addresses that share a common domain or a phone number that falls within a known range of phone numbers, etc.

At 212, based on the comparison, the certificate authority authentication system 102 communicates with the target certificate recipient. In some cases, such as when the certificate authority authentication system 102 determines that the verified untrusted certificate validation data and the trusted certificate validation data constitute a match, the communication can include a digital certificate that identifies the relationship between the public key and the target certificate recipient. In some embodiments, such as when the certificate authority authentication system 102 determines that the verified untrusted certificate validation data and the trusted certificate validation data do not constitute a match, the communication includes a request for more data or a verification request using the confirmed certificate validation data. In certain embodiments, such as when the certificate authority authentication system 102 determines that the untrusted certificate validation data cannot be confirmed or verified, the communication includes a certificate request rejection.

Figure 3:
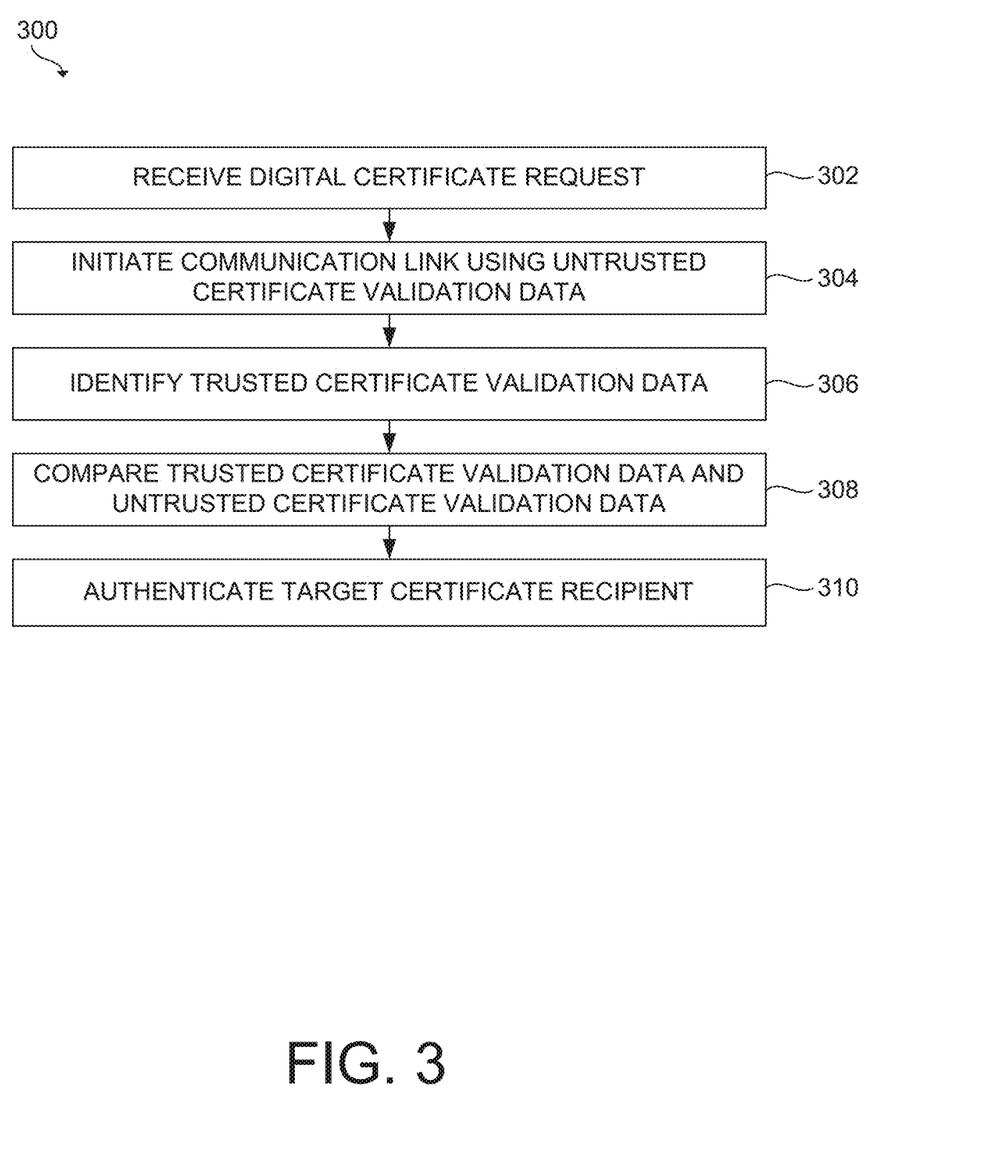
FIG. 3 is a flow diagram illustrative of an embodiment of authenticating a target certificate recipient using verified untrusted certificate validation data.

FIG. 3 is a flow diagram illustrating an embodiment of a routine 300 implemented by a certificate authority authentication system 102 to authenticate a target certificate recipient.

At block 302, the certificate authority authentication system 102 receives a certificate request for a target certificate recipient. As described herein, the authority authentication system 102 can receive the certificate request from the requesting computing system 104 and the target certificate recipient can be the requesting computing system 104 or another computing system or entity. The certificate request can include a public key from a public-private key pair, an identifier for the target certificate recipient, and certificate validation data, such as, but not limited to an email address, URL, phone number, physical address, domain name, etc., that is not trusted by the certificate authority authentication system 102.

At block 304, the certificate authority authentication system 102 can automatically, without human intervention, initiate a communication link based on the untrusted certificate validation data. For example, the certificate authority authentication system 102 can initiate a phone call or email message using the untrusted certificate validation data. Based on a response to the communication link (e.g., confirmation via email, connection to a server via a Uniform Resource Locator (URL) provided via the communication link, response to phone call, etc.), the certificate authority authentication system 102 can generate, or identify the untrusted certificate validation data as, verified untrusted certificate validation data.

At block 306, the certificate authority authentication system 102 can identify trusted certificate validation data based on the untrusted certificate validation data and one or more communications with a confirmation computing system 106. In some embodiments, block 306 can be performed concurrently or after block 304. Accordingly, the certificate authority authentication system 102 can use the untrusted certificate validation data to concurrently perform a verification with the target certificate recipient and to perform a confirmation with the confirmation computing system 106. In certain embodiments, block 306 is only performed after block 304 or only performed if the untrusted certificate validation data is successfully verified at block 304.

In some cases, the certificate authority authentication system 102 can perform the verification with the target certificate recipient prior to performing the confirmation with the confirmation computing system 106. Further, in certain embodiments, the certificate authority authentication system 102 can perform the confirmation with the confirmation computing system 106 prior to performing the verification with the target certificate recipient (e.g., the certificate authority authentication system 102 may initiate the confirmation prior to the verification or complete the confirmation prior to the verification). However, in some such embodiments, the certificate authority authentication system 102 may not use trusted certificate validation data to perform the verification. Rather, in some such embodiments (verification before, after, or concurrently with confirmation), the certificate authority authentication system 102 can use the untrusted certificate validation data to perform the verification with the target certificate recipient. In certain cases, the use of the untrusted certificate validation data to perform the verification is important to realize the benefits of the increased speed and efficiency for authentication and issuance of digital certificates.

In some cases, the certificate authority authentication system 102 receives the trusted certificate validation data from the confirmation computing system 106 and compares it with the untrusted certificate validation data. In certain embodiments, the certificate authority authentication system 102 provides the untrusted certificate validation data to the confirmation computing system 106, and the confirmation computing system 106 compares the untrusted certificate validation data with the trusted certificate validation data in its system. Based on the comparison, the certificate authority authentication system 102 generates or identifies trusted certificate validation data. As described herein, the trusted certificate validation data can be the same as or different from the untrusted certificate validation data. For example, the trusted certificate validation data can include additional or different information than what was included in the untrusted certificate validation data.

At block 308, the certificate authority authentication system 102 compares the trusted certificate validation data with the verified untrusted certificate validation data.

At block 310, the certificate authority authentication system 102 authenticates the target certificate recipient. As described herein, the certificate authority authentication system 102 can authenticate the target certificate recipient based on a determination that the trusted certificate validation data matches, or is sufficiently similar to, the untrusted certificate validation data.

Fewer, more, or different steps can be included in the routine 300 as desired. For example, in response to the authentication of the target certificate recipient, the certificate authority system issues a digital certificate for the target certificate recipient. As another example, if the certificate authority authentication system 102 determines that the untrusted certificate validation data does not match data from the confirmation computing system 106 or if the untrusted certificate validation data cannot be verified by the certificate entity, the certificate authority authentication system 102 can terminate the authentication process. Similarly, if verified untrusted certificate validation data does not match or is not sufficiently similar to the confirmed certificate validation data, then the certificate authority authentication system 102 can initiate a verification using the confirmed certificate validation data (e.g., perform block 304 using confirmed certificate validation data).

Although described herein with reference to authenticating digital certificate validation data and/or an entity requesting a digital certificate, it will be understood that the concepts described herein can be used in conjunction with a variety of technologies used to authenticate requests, such as, but not limited to level 3, blockchain, bank transfers, etc.

Terminology

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method for authenticating a target recipient for a digital certificate, the method comprising:
receiving, at a certificate authority authentication system, a request for a digital certificate, the request including a public key of a public-private key pair, an identification of a target certificate recipient, and untrusted certificate validation data;
verifying a relationship between at least a first portion of the untrusted certificate validation data and the target certificate recipient to provide verified untrusted certificate validation data, wherein verifying the relationship between the at least a first portion of the untrusted certificate validation data and the target certificate recipient comprises automatically initiating a communication link using the at least a first portion of the untrusted certificate validation data;
following, or concurrently with, verifying the relationship between the at least a first portion of the untrusted certificate validation data and the target certificate recipient, comparing a second portion of the untrusted certificate validation data or the verified untrusted certificate validation data with entity specific data of the target certificate recipient to provide trusted certificate validation data, wherein the entity specific data is obtained from a confirmation computing system;
comparing the trusted certificate validation data with the verified untrusted certificate validation data;
based at least in part on an identification of a match between the trusted certificate validation data and the verified untrusted certificate validation data, authenticating the target certificate recipient; and
issuing the requested digital certificate for the target certificate recipient.

2. The method of claim 1, wherein the confirmation computing system is distinct from and unaffiliated with the target certificate recipient.

3. The method of claim 1, wherein the comparing the second portion of the untrusted certificate validation data or the verified untrusted certificate validation data with the entity specific data occurs only after verifying the relationship between the at least a first portion of the untrusted certificate validation data and the target certificate recipient.

4. The method of claim 1, wherein the verified untrusted certificate validation data corresponds to the at least a first portion of the untrusted certificate validation data after the at least a first portion of the untrusted certificate validation data has been verified with the target certificate recipient.

5. The method of claim 1, wherein comparing the trusted certificate validation data with the verified untrusted certificate validation data occurs only after verifying the relationship between the at least a first portion of the untrusted certificate validation data and the target certificate recipient to provide verified untrusted certificate validation data.

6. The method of claim 1, wherein comparing the at least a second portion of the untrusted certificate validation data or the verified untrusted certificate validation data with entity specific data of the target certificate recipient comprises comparing the at least a second portion of the untrusted certificate validation data with the entity specific data of the target certificate recipient to provide the trusted certificate validation data.

7. The method of claim 1, wherein comparing the at least a second portion of the untrusted certificate validation data or the verified untrusted certificate validation data with entity specific data of the target certificate recipient comprises comparing the verified untrusted certificate validation data with the entity specific data of the target certificate recipient to provide the trusted certificate validation data.

8. Non-transitory computer-readable media including computer-executable instructions that, when executed by a computing system, cause the computing system to:
receive, at a certificate authority authentication system, a request for a digital certificate, the request including a public key of a public-private key pair, an identification of a target certificate recipient, and untrusted certificate validation data;
verify a relationship between at least a first portion of the untrusted certificate validation data and the target certificate recipient to provide verified untrusted certificate validation data, wherein, to verify the relationship between the at least a first portion of the untrusted certificate validation data and the target certificate recipient, the computer-executable instructions further cause the computing system to automatically initiate a communication link using the at least a first portion of the untrusted certificate validation data;
following, or concurrently with, verifying the relationship between the at least a first portion of the untrusted certificate validation data and the target certificate recipient, compare a second portion of the untrusted certificate validation data or the verified untrusted certificate validation data with entity specific data of the target certificate recipient to provide trusted certificate validation data, wherein the entity specific data is obtained from a confirmation computing system;
compare the trusted certificate validation data with the verified untrusted certificate validation data;
based at least in part on an identification of a match between the trusted certificate validation data and the verified untrusted certificate validation data, authenticate the target certificate recipient; and
issue the requested digital certificate for the target certificate recipient.

9. The non-transitory computer-readable media of claim 8, wherein the confirmation computing system is distinct from and unaffiliated with the target certificate recipient.

10. The non-transitory computer-readable media of claim 8, wherein comparing the second portion of the untrusted certificate validation data or the verified untrusted certificate validation data with entity specific data of the target certificate recipient occurs only after verifying the relationship between the at least a first portion of the untrusted certificate validation data and the target certificate recipient.

11. The non-transitory computer-readable media of claim 8, wherein, to automatically initiate the communication link, the computer-executable instructions further cause the computing system to cause initiation of a plurality of emails between the certificate authority authentication system and the target certificate recipient.

12. The non-transitory computer-readable media of claim 8, wherein, to automatically initiate the communication link, the computer-executable instructions further cause the computing system to cause initiation of an automatically initiated telephone call between the certificate authority authentication system and the target certificate recipient.

13. A method for authenticating a target recipient for a digital certificate, the method comprising:
receiving, at a certificate authority authentication system, a request for a digital certificate from the target recipient, the request including a public key of a public-private key pair, an identification of the target recipient, and untrusted certificate validation data, the untrusted certificate validation data including contact information associated with the target recipient;
sending, from the certificate authority authentication system, a verification request message to the target recipient using the contact information of the untrusted certificate validation data, wherein the verification request message is sent to the target recipient to verify a relationship between at least the contact information of the untrusted certificate validation data and the target recipient to provide verified untrusted certificate validation data, wherein the certificate authority authentication system sends the verification request message before comparing the untrusted certificate validation data or the verified untrusted certificate validation data with entity specific data of the target recipient to provide trusted certificate validation data, wherein the entity specific data is obtained from a confirmation computing system;
receiving, at the certificate authority authentication system, a response to the verification request message; and
determining, based on the response, the verified untrusted certificate validation data.

14. The method of claim 13 further comprising:
obtaining, at the certificate authority authentication system, the entity specific data from the confirmation computing system;
comparing, with the certificate authority authentication system, the untrusted certificate validation data or the verified untrusted certificate validation data with the entity specific data of the target recipient to provide the trusted certificate validation data;
based at least in part on an identification of a match between the trusted certificate validation data and the verified untrusted certificate validation data, authenticating the target recipient; and
issuing the requested digital certificate to the target recipient.

15. The method of claim 13, wherein the contact information of the untrusted certificate validation data comprises a phone number or email address of the target recipient and wherein sending the verification request message comprises automatically causing initiation, with the certificate authority authentication system, of a phone call or email message using the phone number or email address of the target recipient.

16. The method of claim 13, wherein the confirmation computing system is distinct from and unaffiliated with the target recipient.

17. The method of claim 13, wherein comparing the untrusted certificate validation data or the verified untrusted certificate validation data with the entity specific data of the target recipient comprises:
obtaining, at the certificate authority authentication system, the entity specific data from the confirmation computing system;
comparing, with the certificate authority authentication system, the untrusted certificate validation data or the verified untrusted certificate validation data with the entity specific data of the target recipient to provide the trusted certificate validation data; and
based at least in part on an identification of a match between the untrusted certificate validation data or the verified untrusted certificate validation data with the entity specific data of the target recipient to provide the trusted certificate validation data providing the trusted certificate validation data.

18. The method of claim 13, wherein sending the verification request message to the target recipient comprises validating that the contact information of the untrusted certificate validation data is usable to contact the target recipient.

19. The method of claim 13, wherein the contact information of the untrusted certificate validation data comprises a Uniform Resource Locator (URL) of a server associated with the target recipient and wherein sending the verification request message to the target recipient and receiving the response to the verification request message comprises:
initiating and establishing a connection between the certificate authority authentication system and the server associated with the target recipient using the URL of the server.

* * * * *